April 21, 1970
D. C. BLIEK ET AL
3,507,596
BEAT FREQUENCY INTERFEROMETER
Filed Jan. 20, 1966
2 Sheets-Sheet 1
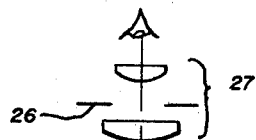
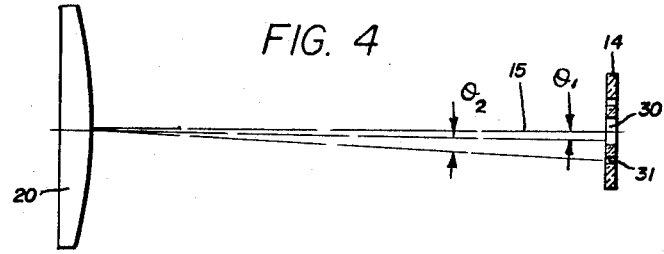
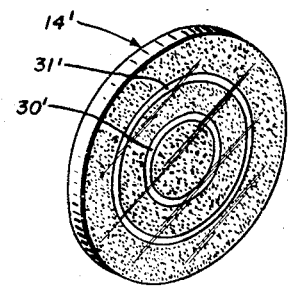
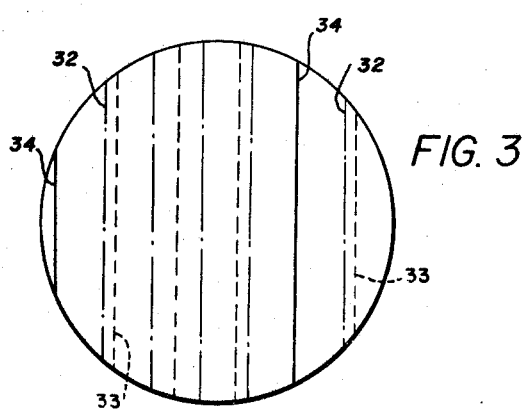
DAVID C. BLIEK
RALPH K. DAKIN
CHARLES F. MOONEY
INVENTORS
BY Frank C. Parks
ATTORNEY

DAVID C. BLIEK
RALPH K. DAKIN
CHARLES F. MOONEY
INVENTORS

United States Patent Office

3,507,596
Patented Apr. 21, 1970

3,507,596
BEAT FREQUENCY INTERFEROMETER
David C. Bliek, Macedon, Ralph K. Dakin, Pittsford, and Charles F. Mooney, Irondequoit, N.Y., assignors to Bausch & Lomb Incorporated, Rochester, N.Y., a corporation of New York
Filed Jan. 20, 1966, Ser. No. 521,768
Int. Cl. G01b
U.S. Cl. 356—106                                6 Claims

ABSTRACT OF THE DISCLOSURE

Optical apparatus is provided for forming a beat fringe in an optical interference pattern. The beat fringes are a coarse means of counting fringes. The beat fringes are formed by introducing two wavelengths of light into the interferometer, the wavelengths being commensurable or nearly commensurable. If thewavelengths are not commensurable, one wavelenth is introduced into the interferometer at a slight angle to alter the effective wavelength, thereby making the two effective wavelengths truly commensurable and; therefore, producing a true beat frequency fringe pattern.

---

The present invention relates to an interferometer and more particularly relates to means and method for producing in the fringe pattern thereof a beat frequency.

Under some conditions of use, the field of view of an interferometer is so crowded with close fringes as to make the counting operation a tedious and time-consuming chore. In an effort to avoid this difficulty electronic scanning devices have been provided to count the fringes in the fringe pattern but such apparatus is cumbersome and costly.

In view of the above-mentioned difficulty, it is an object of the present invention to provide an interferometer which is so constructed and arranged as to provide in the field of view of the instrument a fringe pattern having a beat fringe, i.e., a strongly reinforced fringe occurring in the fringe pattern at regularly spaced intervals whereby a coarse scale for counting fringes is provided.

It is a further object to provide an interferometer which produces a beat fringe effect clearly, distinctly and reliably by simple and direct means at least cost.

Further objects and advantages reside in the details of construction relating to the form, composition and arrangement of parts thereof as described in the following specification and shown in the accompanying drawings, wherein:

FIG. 1 is an optical diagram illustrating generally one form of the present invention;

FIG. 2 is a perspective view showing one of the essential optical parts of said invention;

FIG. 3 is a schematic view showing the field of the instrument;

FIG. 4 is an optical diagram showing certain essential optical parts of said instrument;

FIG. 5 is a view similar to FIG. 2 showing an alternative construction of that optical member.

Figure 6:
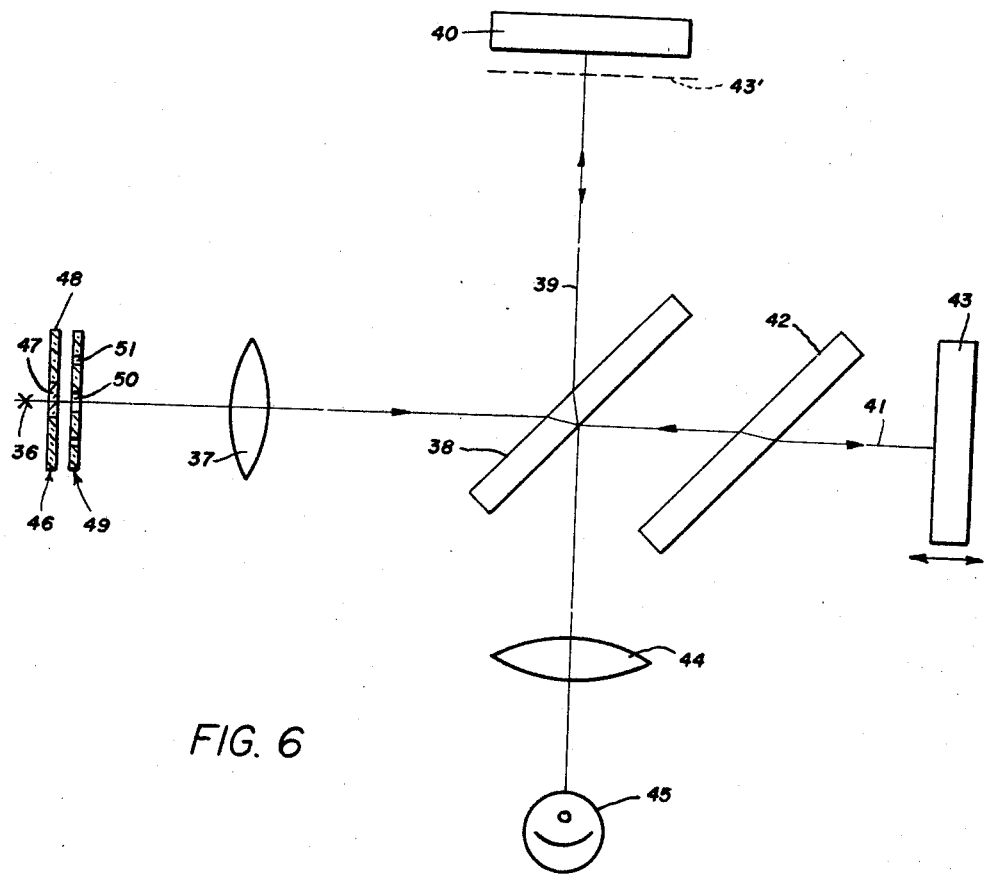
FIG. 6 is an optical diagram showing another form of said invention.

During the course of development of the present invention, it was discovered that it is possible by a proper choice of input wavelengths to produce in the field of view of an interferometer a system or pattern of fringes having a strong periodic reinforcement.

It was further discovered during said development that the aforesaid periodic reinforcement of the fringes could be produced in the fringe pattern of an interferometer by using a light source which is composed of two nearly commensurable bright lines of the spectrum in a specified manner. Generally speaking, said manner contemplates introducing two kinds of light into the interferometer from two prescribed different directions such that the individual fringe patterns formed thereby are commensurable. Such a phenomenon may be produced in a number of different kinds of interferometers including Fizeau, Michelson, Fabry-Perot, etc., although the application of the present invention to the Fizeau interferometer has been selected for detailed description herebelow. If, for example, a combination of the two wavelengths is available wherein the space occupied by four fringes due to the longer wavelength is exactly equal to the space occupied by five fringes due to the shorter wavelength, the aforesaid reinforcement will be observed and the two wavelengths are said to be truly commensurate. It will be seen that the sequence of strongly reinforced fringes or beat fringe pattern in the field of view per se constitutes a comparatively coarse measuring parameter wihch is a great aid in counting a large number of fringes as stated in the objects of the present invention.

Unfortunately, two or more adequately monochromatic wavelengths of light which have exactly the necessary ratio have not been found in the lamps which are conventionally used as spectral line light sources. It would be very expensive and inconvenient either indirectly or artificially to create such a double wavelength light source, for instance by the use of a suitably designed grating spectrograph.

The present invention provides a way to overcome the abovementioned difficulty in an advantageous manner as follows. For example, if two spectral wavelengths are chosen, such as $\lambda_1 = .54607\mu$ (green) and $\lambda_2 = .43583\mu$ (blue) in the mercury emission spectrum, it is observed at the outset that $4\lambda_1$ is not exactly equal to $5\lambda_2$, i.e., $(4 \times .54607\mu = 2.18428\mu, 5 \times .43582\mu = 2.17915\mu)$. If $\lambda_2$ directed onto the interferometer end mirrors at an angle $\theta_2$ relative to the mirror normals, the apex of said angle being located at the adjacent surface of the collimator lens 20, the wavelength as utilized by the interferometer is altered by the factor $1/\cos \theta_2$. In this case, it will be seen that the 4:5 ratio of $\lambda_1/\lambda_2$ is exactly achieved if $$\cos \theta_2 = \frac{2.17915}{2.18428}$$

which equals .997651 or $\theta_2$=about 4 degrees.

The assumptions in this case require that the aperture admitting light no longer be only a pinhole, such as ordinarily found in the Fizeau type of interferometer. A suitable aperture for the light is provided by a pinhole surrounded by a concentric light-transmitting annulus whose effective angular radius, measured to the aforesaid mirror normal at the aforesaid collimator is given by $\theta_2$ in the above equation.

In order to be correct mathematically and physically, the angle $\theta_2$ must be calculated in combination with the effective angular radius of the central hole 30. As shown in FIG. 4, this effective angular radius is called $\theta_1$ and is given by .7R where R is the radius of the central hole. In some cases of practical interest $\cos \theta_1 = 1$, substantially. For instance, a central hole which is 1.0 mm. in diameter and is used with a 100 mm. focal length collimator, results in $\cos \theta_1 = .9999938$.

With reference to one form of the invention shown in FIG. 1 of the drawing, a Fizeau type interferometer is there shown generally by numeral 10 comprising a light source 11 which emits radiation of one or more specific line spectra such as $\lambda_1 = .54607\mu$ (green) and $\lambda_2 = .43584\mu$ (blue) for mercury lamps. The light is imaged through the filter members 13 onto the aperture member 14 as described hereinafter by condenser lens 12, all of which is optically aligned on a horizontal or lateral axis 15 in a Fizeau type of interferometer.

Said axis 15 intersects a vertical main optical axis 16 at an intersection point 17 whereat an inclined flat beam divider type of mirror 18 is located which deflects the light coming from the aperture member or diaphragm 14 downwardly.

In the path of the deflected light rays 19, a collimator lens 20 which collimates the exit light rays 21 is aligned on axis 16. The collimated rays 21 are partly reflected both by surfaces 24 and 23 so that an interference fringe pattern is formed in the usual manner in the region of the test surface 23 formed on the workpiece 22. Above the inclined flat mirror 18 is located an objective lens 25 which is focused on the fringe pattern near surface 23 and forms an image thereof at an image plane 26. An eyepiece 27 is provided for viewing said image at a chosen magnification.

According to one preferred form of the present invention, the aforesaid filter member 13 is constructed with a central circular disc area 28 and an outer contiguous annular area 29, said areas having appropriate light filtering properties for passing respectively two commensurate wavelengths $\lambda_1$ and $\lambda_2$ of light as explained hereabove. Adjacent to the filter member 13 toward the inclined mirror 18 is located the aforesaid aperture or diaphragm member 14 which is constructed with two clear areas, one being a circular central aperture 30 and the other being an annular aperture 31 spaced from the central area 30 and the interposed areas being opaque. Area 30 is arranged to pass the monochromatic light of wavelength $\lambda_1$ which emerges from area 28, and the annular aperture 31 is arranged to pass the second wavelength $\lambda_2$ of monochromatic light which emerges from the outer filter area 29.

Alternative geometrical designs for the aperture member 14 of the interferometer are contemplated for facilitating the use of other combinations of commensurable wavelengths than those mentioned hereabove and it may be termed a spatial filter. One such alternative design is shown in FIG. 5 wherein the aperture disc is designated 14' and there is formed thereon an outer light transmitting annular area or aperture 31' and a concentric inner annular aperture 30' in the same manner and according to the same laws as used in constructing the aperture member 14 of FIG. 2.

The generic mathematical relationship between the cosines of the half angles $\theta_1$ and $\theta_{22}$ and the wavelengths $\lambda_1$ and $\lambda_2$ to which they relate is stated in the following equation:

$$\frac{q\lambda_2}{p\lambda_1} = \frac{\cos \theta_2}{\cos \theta_1}$$

where $p$ and $q$ are integers. The above equation applies regardless of whether the aperture member is constructed in the form shown in FIG. 2 or the form shown in FIG. 5. In the particular case here described, the identifying letters $q$ and $p$ of the formula have numerical values of 5 and 4 respectively.

Photoelectric or optical means are provided for detecting the aforesaid beat fringe pattern, and in one form of the invention a visual image is formed as follows. The image of the fringe pattern formed by the two wavelengths of light as above described appears as shown in FIG. 3 in the field of view wherein the dot-dash lines 32 are due to one wavelength $\lambda_2$ of light and are spaced closer to each other than the dotted lines 33 which denote the fringes due to the wavelength $\lambda_1$ of light. A series of beat fringes 34 denoted by the solid lines occurs at regular intervals where the fringes due to the $\lambda_1$ light exactly overlap the fringes due to the $\lambda_2$ light and when this phenomena occurs, the wavelengths $\lambda_1$ and $\lambda_2$ are said to be commensurate with each other as defined heretofore.

As mentioned in the foregoing description, the present invention is applicable to substantially all known kinds of interferometers with good effect, and in addition to the Fizeau type interferometer above described, a Michelson type interferometer is shown in FIG. 6 having said invention incorporated therein.

With reference to FIG. 6, an extended light source 36 is provided which strongly emits light of at least two wavelengths that are transmitted by appropriate areas of the filter member 46. The light that proceeds through each point of the aperture member 49 is collimated by a collimating lens 37. Light is projected therefrom onto an inclined beam divider 38 where a portion of the light is reflected along a transverse optical axis 39 onto a stationary plane mirror 40. Another portion of the collimated light is transmitted by the beam divider 38 along the axis portion 41 through a compensator plate 42 and is reflected by a movable plane mirror 43. Interference of the light waves reflected by the mirrors 43 and 40 takes place and an image of the wave interference pattern is formed by a collective lens 44 on the photoresponsive cell 45. The dotted line 43' shows the effective relative spacing of the plane mirrors 40 and 43 with respect to the intersection point of axes 39 and 41.

In the manner heretofore described in connection with FIG. 1, a filter member 46 is provided having an axial portion 47 which preferentially passes $\lambda_1$ light and a surrounding portion 48 which passes $\lambda_2$ light preferentially. In alignment with and next to member 46 is located an aperture member 49 having circular apertures 50 and 51 which individually pass the different wavelengths $\lambda_1$ and $\lambda_2$ of light. The circular apertures 50 and 51 are so constructed that the two beams of light therefrom are incident on the plane mirrors 40 and 43 at such an angle that the aforesaid pair of commensurable fringe patterns are formed at the photoresponsive cell 45 exhibiting the novel beat effect or periodical reinforcement of certain fringes in the fringe pattern.

From the foregoing description, it will be apparent that there is here provided means for the construction of an interferometer which produces a periodically reinforced or prominent series of fringes of beat frequency in the fringe pattern, the apparatus whereby said phenomena is effected being simple in construction, reliable, and capable of utilizing a plurality of combinations of nearly commensurate wavelengths of light, or may even be effected by the use of a single wavelength of light.

Although only certain forms of the present invention have been shown and described in detail, other forms are possible and changes may be made in the combination and details of construction without departing from the spirit of the invention.

We claim:

1. A method of producing a periodical reinforcement effect in the interference fringes formed in an interferometer, said method being characterized by the steps of selecting two wavelengths $\lambda_1$ and $\lambda_2$ of light which produce individual fringe systems, and causing the light beams of wavelengths $\lambda_1$ and $\lambda_2$ to arrive at the plane mirrors constituting the interferometer at different incidence angles $\theta_1$ and $\theta_2$ which are related to each other as specified in the equation herebelow wherein $p$ and $q$ are integers, the average values $\lambda_1$, $\lambda_2$, cos $\theta_1$, and cos $\theta_2$ being used, $$\frac{q\lambda_2}{p\lambda_1} = \frac{\cos \theta_2}{\cos \theta_1}$$

2. In interferometers generically the combination of means for superimposing the interfering wavefronts of a plurality of light beams of different wavelengths which travel through the interferometer in slightly different directions, and means for establishing said different directions of travel for said light beams in such a manner that the interference patterns formed thereby are commensurable to each other whereby the normal fringe pattern complexity is reduced to the beat that is common to the patterns of light coming from said different directions.

3. An interferometer as set forth in claim 2 wherein the first means includes a pair of nearly parallel flat surfaces between which said light beams are reflected repeatedly, and wherein the second means includes a filter member having two concentric zones which transmit light of different wavelengths $\lambda_1$ and $\lambda_2$, said second means further including an aperture plate having two concentric apertures which are aligned respectively with said zones to receive light therefrom, the half angles $\theta_1$ and $\theta_2$ which are subtended by the effective radii of said concentric apertures being specified by the following formula $$\frac{q\lambda_2}{p\lambda_1} = \frac{\cos\theta_2}{\cos\theta_1}$$

wherein $p$ and $q$ are integers.

4. An interferometer as set forth in claim 3 further characterized by
the numerical values of $q$ and $p$ being respectively 5 and 4.

5. An interferometer as set forth in claim 3 further characterized by the following values for $\lambda_1$ and $\lambda_2$, $$\lambda_1 = .54607 \text{ microns}$$
$$\lambda_2 = .43583 \text{ microns}$$

6. A Fizeau type of interferometer for producing a beat fringe pattern in the field of the instrument, said interferometer comprising a reflecting surface to be measured, a semi-reflective surface spaced above the first surface so that collimated light beams are reflected repeatedly there between to form a fringe pattern, a light source optically aligned to effectively illuminate the two surfaces, said source being characterized by strong visible radiation of at least two commensurable wavelengths $\lambda_1$ and $\lambda_2$, a collimating lens which is optically aligned between said source and surfaces so as to collimate the light which is incident on said surface, a light filter member located near said light source and aligned therewith, said member having a central area which passes light of one of said wavelengths and a surrounding area which passes light of another of said wavelengths, an aperture member aligned next to said filter member at the back focus of the said collimating lens, means on said aperture member defining a central aperture and at least one outer concentric transparent annular aperture which are arranged to transmit individually one of said commensurable wavelengths, the central angle $\theta_1$ subtending the effective radius of said central aperture and the central angle $\theta_2$ subtending the effective radius of said annular aperture being mathematically related to the wavelengths $\lambda_1$ and $\lambda_2$ according to the following expression:

$$\frac{q\lambda_2}{p\lambda_1} = \frac{\cos\theta_2}{\cos\theta_1}$$

wherein $p$ and $q$ are integers, the light from any point on said apertures being collimated by said lens, and means for detecting the beat fringe pattern which is created by superpositioning of individual fringe patterns which are due to the respective wavelengths $\lambda_1$ and $\lambda_2$ of light.

References Cited

"Multiple-Wavelength Multiple-Beam Interferometric Observation of Flat Surfaces"; D. R. Herriott; JOSA; vol. 51, No. 10.

"Multiple-Pinhole Multiple-Beam"; M. V. R. K. Murty; Applied Optics; vol. 1, No. 3.

RONALD L. WILBERT, Primary Examiner

C. CLARK, Assistant Examiner